Patented Mar. 2, 1937

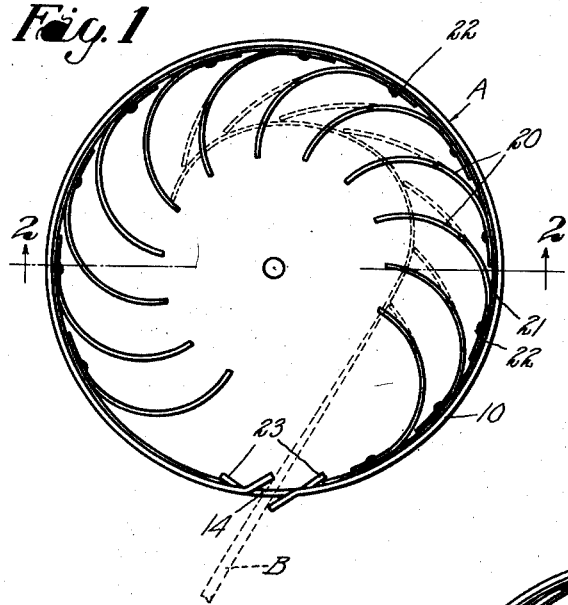
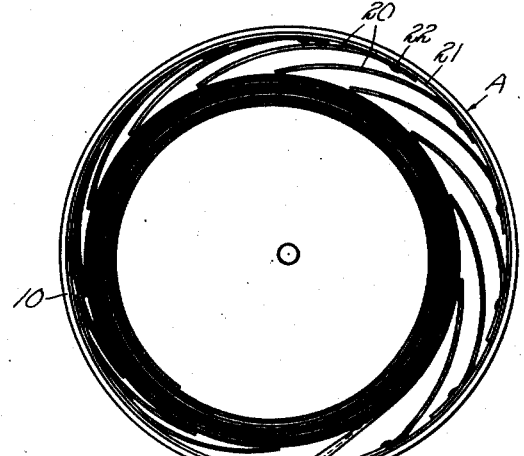
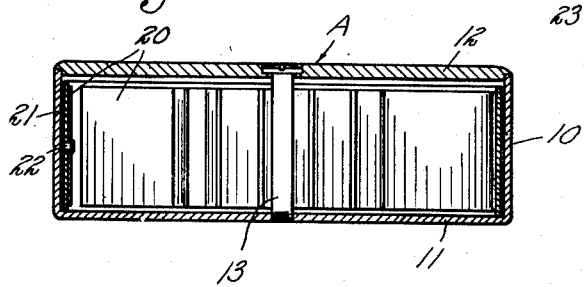
Inventor
Frederick A. Volz

2,072,538

UNITED STATES PATENT OFFICE 2,072,538

COILABLE MEASURING RULE

Frederick A. Volz, New Britain, Conn., assignor to The Stanley Works, New Britain, Conn., a corporation of Connecticut Application February 11, 1935, Serial No. 5,963

10 Claims. (Cl. 33—138)

This invention relates to coilable rules of the type having a casing and a measuring tape adapted to be wound therein into an externally wound coil, the tape being in the form of a strip of metal having a bent transverse form (for example, a concavo-convex cross section) so that it will resist bending and will, when extended, automatically assume a rectilinear state or straight rod-like form.

The aim of the invention is to provide an improved construction in a rule of this type which will permit the tape to be drawn from the casing with a smooth and easy action by pulling on the extended portion of the tape, which will permit the tape to be wound up within the casing with a substantially equally smooth and easy action by exerting a longitudinal thrust or push on the projected straight portion of the tape, and which will automatically retain the coiled portion of the tape in a state of quiescence and against uncoiling, all without the use or provision of spring or manual winding means or manipulative devices for controlling or affecting the winding and unwinding operations.

More particularly, an aim of the invention is to provide an improved rule of the "pull-push" type having a casing within which is spring retaining means for causing the tape to assume a coiled form as the tape is pushed into the casing, the spring retaining means comprising a multiplicity of flexible spring fingers engaging the external surface of the outside convolution of the coil at circumferentially spaced points with just sufficient pressure to maintain the size of the coil without interfering with the smooth and easy action present in the winding and unwinding operations. By proceeding in accordance with the present invention, there is no snubbing and no undue binding action between the spring fingers and the coiled tape.

A further aim of the invention is to provide an improved rule of this character which is of simple and practical construction, which may be conveniently and easily handled, and which may be manufactured at a relatively low cost.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing wherein is shown, for illustrative purposes, one of the embodiments which the present invention may take:

Figure 1 is a side view of my improved rule, the spring fingers being shown by full lines in the positions which they have when the tape is entirely withdrawn from the casing, the action of the fingers also being illustrated by dotted lines as the forward end of the tape is initially pushed into the casing;

Fig. 2 is a view similar to Fig. 1 but showing the tape as being partially wound up within the casing; and Fig. 3 is a transverse sectional view taken substantially on line 2—2 of Fig. 3.

Referring to the drawing in detail, the casing A, which may be of any suitable construction, is here shown, for illustrative purposes, as having a cylindrical wall 10 and end walls 11 and 12. The walls 10 and 11 may be formed of a piece of thin sheet metal drawn to cup shape. The wall 12 may be in the form of a cover held in place by a screw 13. The peripheral wall 10 is provided with a transverse opening 14 for accommodating the tape. The tape, designated generally by the character B, is of the type described in the patents to H. A. Farrand No. 1,402,589 granted January 3, 1922 and No. 1,730,199 granted October 1, 1929. This tape is in the form of a metallic ribbon having a concavo-convex cross section and sufficiently flexible to be rolled or coiled; its stiffness and resiliency permitting it to assume a rectilinear state when unrestricted. When a rule of this type is freely bent longitudinally, its cross sectional form at its bent portion is changed from an arcuate to a flat, and the bent portion assumes a longitudinal curvature the radius of which generally corresponds to the radius of the arc of the cross sectional form of the rule in its extended state. In order to facilitate initial entry of the rule into the casing, the end of the rule which goes into the casing first and which ordinarily bears the highest scale mark, is rendered more easily bendable or flexible, as described in my Patent No. 1,983,503 granted December 4, 1934.

In accordance with the present invention, the spring retainer for causing the measuring tape to take a coiled form and for maintaining the coil comprises a multiplicity of circumferentially arranged flexible spring fingers 20 having portions inclined inwardly of the casing and in the direction in which the tape is wound up into a coil. The inner ends of the inclined portions extend transversely of and engage the outer surface of the outermost convolution of the coiled tape, the area of engagement between each spring finger and the coil being relatively small. In the present illustrative disclosure, the spring fingers 20 are illustrated as being longitudinally curved generally in the direction in which the tape is wound up as it is pushed into the casing, and as having their outer ends secured to a base strip 21, as by means of rivets 22. The inner free ends of the spring fingers are adapted to engage the sleeve 13 when the tape is entirely withdrawn from the casing and, of course, engage the outer convolution of the coil when the tape is wound within the casing. The base strip 21 may comprise a strip of thin metal of a resilient nature so that when placed within the casing it will expand against and conform to the shape of the peripheral wall 10. The spring retainer may be secured against creeping or crawling action with respect to the casing by a pair of lugs 23 struck from the cylindrical wall 10 at opposite sides of the slot 14 therein. These lugs extend slightly into the casing and away from the slot. The strip 21 is of such length that its opposite ends engage in the grooves provided between the free ends of the lugs and the portions of the wall 10 from which the lugs are struck.

With the arrangement described, it is observed that the fingers and, more particularly in the present instance, the concave surfaces of the fingers, successively serve to guide the inner end of the tape as it is initially pushed into the casing and formed into the initial convolution, the fingers collectively forming, so to speak, a guide for causing the inner end of the tape to take a cylindrical form of a predetermined radius somewhat comparable to, but preferably larger than, the natural longitudinal curvature of the tape when it is freely bent transversely. The action of the fingers, as the inner end of the tape is pushed into the casing, is shown by dotted lines in Fig. 1. It will be observed that each finger presents to the inner end of the tape a smooth, unbroken surface so that the inner end of the tape may freely ride or slide, without obstruction, along these surfaces towards the free end of the fingers. As the coil is built up on continued pushing in of the tape, the external diameter of the coil is increased while the internal diameter will remain substantially constant, and the fingers, being readily flexible, will permit this building up of the coil without undue friction or binding action so that complete winding up of the tape may be effected in an easy and smooth manner throughout. The pressure exerted by the spring fingers, however, is sufficient to prevent the coil from unwinding, that is, sufficient to substantially maintain the inner diameter of the coil substantially constant. In the winding up operation, the casing may be held in one hand and the extended portion of the tape may be grasped with the other hand at a considerable distance from the casing and then the intervening portion of the tape may be pushed into the casing without danger of that portion buckling or bending, this being of advantage in that the entire tape may be wound up by exerting a relatively few number of thrusts. Obviously, when it is desired to take measurements, the tape may be withdrawn from the casing by merely pulling on the outer end of the tape.

It will be observed that I provide a spring retainer having a relatively large number of spring elements each of which within itself is quite flexible and each of which has a relatively short circumferential length of engagement with the coiled tape, this being of advantage in that the springs may individually accommodate themselves very readily to the coil as its diameter increases or decreases in size when the tape is pushed into or pulled out of the casing. Furthermore, with this arrangement, there is no rapping or snubbing action such as would be present if a single spring member was employed as a retainer. The amount of friction or drag between the fingers and the coil, whether the tape is being coiled or uncoiled, varies but little so that a substantially uniform action is obtained during the winding and unwinding operations.

It will further be observed that, in accordance with the present invention, I provide an improved rule of simple and practical construction which is very efficient and reliable in operation, which may be conveniently and readily handled, and which is relatively inexpensive to manufacture.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a rule of the character described, a resilient measuring tape having a transverse curvature and an inherent tendency to assume a rectilinear state, a casing having an entrance slot through which said tape is moved, and non-rotatable spring retaining means within said casing for causing the measuring tape to take a coiled form as it is pushed into the casing and for maintaining the coil and comprising a multiplicity of flexible spring fingers engaging the external surface of the outside convolution of the coil at circumferentially spaced points with sufficient pressure to maintain the size of the coil without interfering with the smooth and easy action present in the winding and unwinding operations, said spring fingers having portions inclined inwardly of the casing in the direction in which the tape is wound into a coil, the inner ends of said inclined portions engaging the outer surface of the outermost convolution of the coil.

2. In a rule of the character described, a resilient measuring tape having a transverse curvature and an inherent tendency to assume a rectilinear state, a casing having an entrance slot through which said tape is moved, and spring means within the casing comprising a plurality of circumferentially arranged flexible spring fingers having portions inclined inwardly of the casing and in the direction in which the tape is wound up into a coil, the inner ends of said inclined portions of said fingers being adapted to engage the outer surface of the outer convolution of the coiled tape at spaced circumferential points, said spring fingers forming a guide for the inner end of the tape so as to cause the tape to take an externally coiled form as it is pushed into the casing, and said fingers automatically expanding and contracting in a direction generally radially of the casing as the tape is pushed into the casing and withdrawn therefrom and maintaining a pressure against the external convolution of the tape to hold the tape in any extended position.

3. In a rule of the character described, a resilient measuring tape having a transverse curvature and an inherent tendency to assume a rectilinear state, a casing having a peripheral wall provided with an entrance slot through which the tape is moved, and spring retaining means within said casing and substantially surrounding the coiled portion of the tape for causing the measuring tape to take a coiled form as it is pushed into the casing and for maintaining the coil and comprising a plurality of thin, flexible, spring fingers circumferentially positioned inside of said peripheral wall and inclined inwardly of the casing and in the direction in which the tape is wound up as it is pushed into the casing, the inner ends of said fingers being free for movement generally radially of the casing and engaging the outermost convolution of the coiled tape at spaced points and over small areas.

4. In a rule of the character described, a resilient measuring tape having a transverse curvature and an inherent tendency to assume a rectilinear state, a casing having a peripheral wall provided with an entrance slot and through which the tape is moved, and spring retaining means within said casing for causing the measuring tape to take a coiled form as it is pushed into the casing and for maintaining the coil, said spring retaining means substantially surrounding the coiled portion of the tape and comprising a multiplicity of thin sheet metal flexible spring fingers circumferentially spaced apart within the casing and inclined generally inwardly of the casing in the direction in which the tape is wound up into a coil, the inner ends of said fingers engaging the outer surface of the outer convolution of the coiled tape at circumferentially spaced points and being free to be moved generally radially of the casing by the tape as it is built up into a coil, said fingers being curved in the direction in which the tape is wound up as it is pushed into the casing, said fingers having concave faces presenting smooth unobstructed surfaces to the inner end of the tape as it is initially pushed into the casing.

5. In a rule of the character described, a resilient measuring tape having a transverse curvature and an inherent tendency to assume a rectilinear state, a casing having a peripheral wall provided with an entrance slot through which said tape is moved, a flexible thin metal strip within said peripheral wall of the casing and about the coiled portion of the tape, and a multiplicity of spring fingers extending from said strip inwardly of the casing and generally in the direction in which the tape is wound up as it is pushed into the casing, said fingers being circumferentially spaced apart and having their inner ends engaging the outer surface of the outermost convolution of the coiled tape.

6. In a rule of the character described, a resilient measuring tape having a transverse curvature and an inherent tendency to assume a rectilinear state, a casing having a peripheral wall provided with an entrance slot through which said tape is moved, said wall having to each side of said slot a lug struck therefrom and extending into the casing and away from the slot, a flexible thin metal strip fitting within and engaging the inner periphery of said wall of said casing and having its opposite ends engaging in the grooves provided between the free ends of said lugs and the portions of the wall from which the lugs are struck, a multiplicity of spring fingers extending from said strip inwardly of the casing and generally in the direction in which the tape is wound up as it is pushed into the casing, said fingers being circumferentially spaced apart and having their inner ends engaging the outer surface of the outermost convolution of the coiled tape.

7. In a rule of the character described, a resilient measuring tape having a transverse curvature and an inherent tendency to assume a rectilinear state, a casing having an entrance slot through which said tape is moved, and spring retaining means within said casing for causing the measuring tape to take a coiled form as it is pushed into the casing and for maintaining the coil and comprising a multiplicity of inherently resilient spring fingers circumferentially arranged within the casing and substantially encircling the coiled portion of the tape, said fingers having portions at their inner ends adapted to engage the outermost convolution of the coiled tape and arranged to move radially inwardly of the casing and maintain engagement with the outer convolution of the coil as the diameter of the latter decreases when the tape is withdrawn from the casing and arranged to be moved in a direction generally radially outwardly of the casing by the building up of the diameter of the coil when the tape is pushed into the casing.

8. In a rule of the character described, a resilient measuring tape having a transverse curvature and an inherent tendency to assume a rectilinear state, a casing having an entrance slot through which said tape is moved, and non-rotatable spring retaining means within said casing for causing the measuring tape to take a coiled form as it is pushed into the casing and for maintaining the coil and comprising a multiplicity of flexible spring fingers circumferentially arranged within the casing and substantially encircling the coiled portion of the tape, said fingers having their free ends extending generally radially inwardly of the casing and engaging the outermost convolution of the coiled tape, said fingers flexing generally in a radial direction as the tape is pushed into the casing and withdrawn therefrom and maintaining a pressure against the external convolution of the tape to hold the tape in any extended position.

9. In a tape measuring device of the character described, a casing having a tape opening in its peripheral wall, a resilient tape of normally concavo-convex cross sectional shape adapted to be wound within the casing into an externally wound coil, and non-rotatable spring retaining means within the casing and connected thereto and substantially surrounding the coiled tape and comprising a plurality of inherently resilient elements circumferentially spaced about the coiled tape and adapted to resiliently engage the outer surface of the outer convolution of the tape and having sufficient strength to constantly engage the tape and prevent the coils of the tape from frictionally engaging the peripheral wall of the casing.

10. In a rule of the character described, a resilient measuring tape having a transverse curvature and an inherent tendency to assume a rectilinear state, a casing having an entrance slot through which said tape is moved and within which said tape is adapted to be wound into an externally wound coil, and spring retaining means positioned in said casing about the coiled tape and secured to said casing and comprising a plurality of circumferentially spaced apart, inherently resilient elements arranged to frictionally engage the outer surface of the outer convolution of the tape to cause the tape to assume a coiled form within the casing and wind upon itself as it is pushed into the casing, said elements exerting a radially inward pressure against the outer convolution of the coiled tape and arranged to move generally radially of the casing as the tape is pushed into the casing and withdrawn therefrom.

FREDERICK A. VOLZ.